July 24, 1962     G. H. COOK     3,045,546
OPTICAL OBJECTIVES OF VARIABLE FOCAL LENGTH Filed Sept. 29, 1958     2 Sheets-Sheet 1

Inventor
G. H. Cook

July 24, 1962 G. H. COOK 3,045,546
OPTICAL OBJECTIVES OF VARIABLE FOCAL LENGTH
Filed Sept. 29, 1958 2 Sheets-Sheet 2

Inventor
G. H. Cook
By
Holcombe, Wittkuhl + Brisebois
Attorneys

United States Patent Office 3,045,546
Patented July 24, 1962

3,045,546
OPTICAL OBJECTIVES OF VARIABLE FOCAL LENGTH
Gordon Henry Cook, Leicester, England, assignor to Taylor, Taylor & Hobson Limited, Leicester, England, a British company
Filed Sept. 29, 1958, Ser. No. 764,006
Claims priority, application Great Britain Oct. 2, 1957
14 Claims. (Cl. 88—57)

This invention relates to an optical objective for photographic or other purposes, having relatively movable members, whereby the equivalent focal length of the objective can be varied at will, whilst maintaining good correction for the various aberrations.

Desirable features in such an objective include a wide range of continuously variable focal lengths, constant focussing position throughout the range, constant relative aperture throughout the range at any setting of the diaphragm, a short distance from front vertex to focal plane, simplicity of construction to minimise loss of light by absorption and reflection and also to reduce weight, and focussing for near objects independent of focal length.

All these desirable features have been attained by the invention forming the subject of United States of America patent specification No. 2,649,025, according to which the objective comprises an axially movable divergent member located in front of a stationary convergent rear member and behind an axially movable convergent front member, wherein in each operative position the equivalent focal length of the divergent combination of the front two members bears to that of the complete objective a ratio between 8 and 13 times the reciprocal of the f/number of the objective, the virtual image of a distant object formed by such divergent combination having a constant axial position relatively to the stationary rear member throughout the range of variation of the equivalent focal length of the objective, the complete objective being corrected for spherical and chromatic aberrations, coma, astigmatism, field curvature and distortion throughout the range of variation.

It should be made clear that the terms "front" and "rear" are herein used in accordance with the usual convention to relate to the sides of the objective respectively nearer to and further from the longer conjugate.

The present invention has for its object to effect improvements in the variable focus objective of such prior patent, especially in respect of its optical properties, and more particularly, whilst still attaining the desirable features above mentioned, to achieve increased relative aperture and increased angular field of view and at the same time to enable the objective to focus on objects closer to the camera. These improved optical properties render the objective according to the present invention highly suitable, not only for exterior use at relatively great object distances, but also for studio photography or cinematography or television photography.

The objective according to the present invention is corrected for spherical and chromatic aberrations, coma, astigmatism, field curvature and distortion throughout the range of variation, and comprises an axially movable divergent member located in front of a stationary convergent rear member and behind an axially movable convergent front member, wherein throughout the range of variation the ratio of the equivalent focal length of the divergent combination of the front two members to the equivalent focal length of the complete objective remains constant and the virtual image of a distant object formed by such divergent combination has a constant axial position relative to the stationary rear member, and wherein the convergent front member comprises a plurality of convergent components of which at least one is a doublet component having a dispersive internal contact surface and at least one is a simple component, whilst the divergent second member comprises a plurality of divergent components of which at least one is a doublet component having a collective internal contact surface and at least one is a simple meniscus component whose rear surface is convex to the front and has radius of curvature not less than $0.33f_2$ and not greater than the range of axial movement of such divergent second member, where $f_2$ is the equivalent focal length of such second member.

In one arrangement of such objective, the convergent front member comprises a simple convergent component located in front of a convergent doublet component whose front surface is convex to the front with radius of curvature between $0.5f_1$ and $1.0f_1$ (where $f_1$ is the equivalent focal length of the convergent front member), at least one simple meniscus component in the divergent second member having its rear surface convex to the front with radius of curvature not less than $0.5f_2$.

In an alternative arrangement, the convergent front member comprises a convergent doublet component located in front of a simple convergent component whose front surface is convex to the front with radius of curvature between $0.4f_1$ and $0.8f_1$. The internal contact surface in such doublet component is preferably convex to the front with radius of curvature between $0.4f_1$ and $0.9f_1$, the mean refractive index of the material of the front element of such doublet component exceeding that of the rear element thereof by between 0.05 and 0.15.

In either of such arrangements, the radius of curvature of the rear surface of the front component of the convergent front member is preferably greater than $1.5f_1$, whether such surface is convex or concave to the front.

Preferably, the ratio of the equivalent focal length of the divergent combination of the front two members to the equivalent focal length of the whole objective lies between 3 and 8 times the reciprocal of the f/number of the objective.

The equivalent focal length $f_1$ of the convergent front member preferably lies between $1.0f_2$ and $1.67f_2$ times the value of the expression $(1+\sqrt{Q})$, where Q is the ratio of the value of the upper limit of the range of variation of the equivalent focal length of the complete objective to the value of the lower limit thereof. In this case, the ratio of the equivalent focal length of the complete objective at the lower end of the range of variation thereof to the f/number of the objective lies between $0.27f_2$ and $0.56f_2$.

The rear component of the divergent second member preferably consists of a divergent doublet component whose internal contact surface is collective and convex to the front with radius of curvature between $0.66f_2$ and $1.5f_2$, the mean refractive index of the material of the rear element of such doublet component exceeding that of the front element of such component by between 0.15 and 0.3. Preferably, the divergent second member comprises two divergent simple meniscus components in front of a divergent doublet component, and has axial length between $0.6f_2$ and $1.3f_2$.

Preferably, the ratio of the equivalent focal length $f_3$ of the stationary rear member to the equivalent focal length of the complete objective at the lower end of the range of variation thereof lies between 1.25 and $2.5\sqrt{Q}$, and such ratio may also conveniently lie between 0.2 and 1.2 times the f/number of the objective.

The Petzval sum for all the surfaces of the stationary rear member may conveniently lie between 0.3 and 4.0 times the equivalent power of such member.

Conveniently, the diaphragm of the objective is located at or near the front surface of the stationary rear member, and the diameters of the front two members are made larger than is necessary to accommodate the full axial beam. This ensures that the diaphragm will always be the effective aperture stop of the system and that the angle of the cone of light from the rear member to an axial image point will remain constant throughout the range of variation, and therefore that the relative aperture of the objective will remain constant throughout such range for any one setting of the diaphragm.

Focussing for near objects is preferably effected by axial movement of the convergent front member independently of the second and third members.

Conveniently, with the above described objective, useful alternative arrangements thereof may in some circumstances be obtained by replacement of one stationary rear member by another, the front two members remaining unaltered. For this purpose, the lens mount housing the objective may conveniently be provided with means whereby two or more alternative rear members can be selectively attached to the mount in the correct position relative to the front axial movable members.

It should also be mentioned that it is often practicable, with a given example of the above described objective, for such example to be scaled proportionally to suit different ranges of variation of the equivalent focal length of the complete objective, the range of variation of angular field covered by the objective remaining approximately the same in such scaled variants, as also the $f$/number of the objective.

Again, for example in the case of two differently sized television cameras having different sensitivities and whose ranges of variation of equivalent focal length are related by a scaling factor of say 2.5, it may happen that it will suffice for the objective of the larger camera to have an $f$/number about 2.5 times the $f$/number of that of the smaller camera. In such case, it is possible to utilise the same two front members for both cameras, but with different rear members, giving ranges of focal length and also $f$/numbers related by the same factor, say 2.5, but both covering approximately the same range of angular field. A typical example of this is for a television camera having a $f/1.8$ objective with equivalent focal length varying from 2.25 to 8.0 centimetres, and a second television camera having an $f/4.5$ objective with variation of equivalent focal length from 2.25 to 8.0 inches.

A further possibility is, by substitution of a different rear member, to give, in any position of adjustment of the front members, an increased equivalent focal length of the objective, without change of image size, and therefore with reduced angular field.

Widely different types of rear member may be employed, but in general it is important for the rear member to have the correct Petzval sum dependent on that of the front two members, and to provide the correct compensation for the residual distortion and oblique colour aberrations of the front two members. Such distortion and oblique colour compensation can most effectively be provided by suitable choice of the parts of the rear member furthest from the diaphragm of the objective, which as above mentioned is preferably located near the front surface of the rear member.

Thus, the Petzval sum for all the surfaces of the rear member preferably lies between $0.35/f_2$ and $0.7/f_2$, and may also lie between 0.7 and 1.4 times the positive value of the equivalent power of the divergent combination of the front two members in the position of adjustment corresponding to the lower end of the range of variation of the equivalent focal length of the objective.

Usually, the stationary rear member will include at least six air-exposed surfaces, and the rear portion of such member, having the rear four of the air-exposed surfaces, is especially important in connection with the residual aberrations of the front two members.

Thus, the Petzval sum for all the surfaces of such rear portion preferably is positive and lies between 0.25 and 0.85 times the reciprocal of the equivalent focal length of the complete objective at the lower end of the range of variation thereof. For distortion compensation, at least one of the four air-exposed surfaces of such rear portion should preferably be both collective and strongly convex towards the diaphragm. For oblique colour compensation, such rear portion preferably includes at least one internal contact between a convergent element and a divergent element, the Abbé V number of the material of such convergent element exceeding that of such divergent element by at least 20. It should be made clear that the term "internal contact" as used therein is intended to include both an internal cemented contact surface and a broken contact, that is, a contact formed between two surfaces differing by so little in curvature that the contact can be assumed for all practicable purposes to have a radius of curvature equal to the harmonic mean of the radii of curvature of the two surfaces forming such broken contact.

In the case when two alternative rear members are provided for use with the same pair of movable front members, the rear member associated with the higher $f$/number and with the range of higher equivalent focal lengths may consist of two convergent portions separated from one another by an air space whose axial length is greater than the equivalent focal length of either of such portions. For example, the front portion may consist of a convergent doublet component, whilst the rear portion widely spaced therefrom may consist of two convergent doublet components.

Four practical examples of variable focus objective according to the invention will now be described by way of example with reference to the accompanying drawings, in which.

Figure 1:
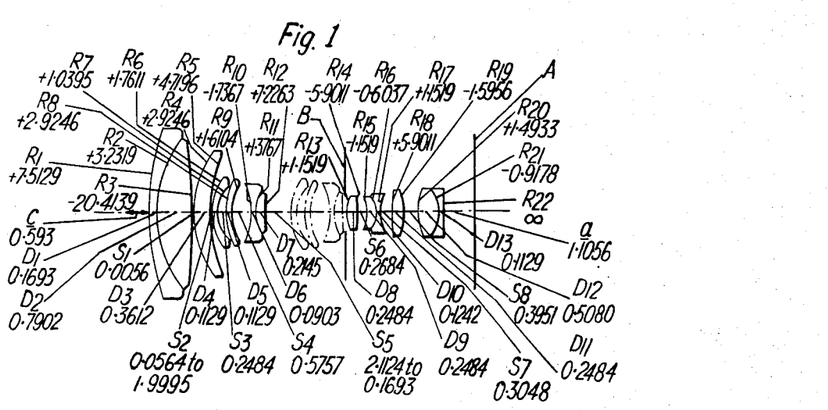
FIGURE 1 shows one example of variable focus objective suitable for use in the smaller of the above-mentioned television cameras, as well as for other uses.

Numerical data for the example of FIGURE 1 are given in the following table, in which $R_1$, $R_2$ . . . represent the radii of curvature of the individual surfaces counting from the front, the positive sign indicating that the surface is convex to the front and the negative sign that it is concave thereto, $D_1$, $D_2$ . . . represent the axial thicknesses of the various elements, and $S_1$, $S_2$ . . . represent the axial air separations between the components, the table also giving the mean refractive index $n_d$ for the $d$-line and the Abbé V number of the material used for each element. The table also gives the clear diameters for the air-exposed surfaces of the objective.

The insertion of equals ($=$) signs in the radius columns of the tables, in company with plus ($+$) and minus ($-$) signs which indicate whether the surface is convex or concave to the front, is for conformity with the usual Patent Office custom, and it is to be understood that these signs are not to be interpreted wholly in their mathematical significance. This sign convention agrees with the mathematical sign convention required for the computation of some of the aberrations including the primary aberrations, but different mathematical sign conventions are required for other purposes including computation of some of the secondary aberrations, so that a radius indicated for example as positive in the tables may have to be treated as negative for some calculations as is well understood in the art.

Example 1

[Equivalent focal length varying from $F_0=1.000$ to $F_m=3.555$. Relative aperture $f/1.8$]

| Radius | Thickness or Air Separation | Refractive Index $n_d$ | Abbé V Number | Clear Diameter |
|---|---|---|---|---|
| $R_1 =+ 7.5129$ | | | | 3.984 |
| | $D_1 = 0.1693$ | 1.7618 | 26.98 | |
| $R_2 =+ 3.2319$ | | | | |
| | $D_2 = 0.7902$ | 1.651 | 58.60 | |
| $R_3 = -20.4139$ | | | | 3.721 |
| | $S_1 = 0.0056$ | | | |
| $R_4 =+ 2.9246$ | | | | 3.248 |
| | $D_3 = 0.3612$ | 1.651 | 58.60 | |
| $R_5 =+ 4.7196$ | | | | 3.113 |
| | $S_2 = 0.0564$ to 1.9995 | | | |
| $R_6 =+ 1.7611$ | | | | 1.795 |
| | $D_4 = 0.1129$ | 1.62344 | 56.22 | |
| $R_7 =+ 1.0395$ | | | | 1.524 |
| | $S_3 = 0.2484$ | | | |
| $R_8 =+ 2.9246$ | | | | 1.510 |
| | $D_5 = 0.1129$ | 1.62344 | 56.22 | |
| $R_9 =+ 1.6104$ | | | | 1.377 |
| | $S_4 = 0.5757$ | | | |
| $R_{10} = - 1.7367$ | | | | 1.156 |
| | $D_6 = 0.0903$ | 1.51507 | 56.35 | |
| $R_{11} =+ 1.3767$ | | | | |
| | $D_7 = 0.2145$ | 1.7618 | 26.98 | |
| $R_{12} =+ 7.2263$ | | | | 1.072 |
| | $S_5 = 2.1124$ to 0.1693 | | | |
| $R_{13} =+ 1.1519$ | | | | 0.986 |
| | $D_8 = 0.2484$ | 1.717 | 46.0 | |
| $R_{14} = - 5.9011$ | | | | 0.960 |
| | $S_6 = 0.2484$ | | | |
| $R_{15} = - 1.1519$ | | | | 0.835 |
| | $D_9 = 0.2484$ | 1.723 | 37.99 | |
| $R_{16} = - 0.6037$ | | | | |
| | $D_{10} = 0.1242$ | 1.64793 | 33.80 | |
| $R_{17} =+ 1.1519$ | | | | 0.805 |
| | $S_7 = 0.3048$ | | | |
| $R_{18} =+ 5.9011$ | | | | 1.005 |
| | $D_{11} = 0.2484$ | 1.6935 | 53.39 | |
| $R_{19} = - 1.5956$ | | | | 1.063 |
| | $S_8 = 0.3951$ | | | |
| $R_{20} =+ 1.4933$ | | | | 1.209 |
| | $D_{12} = 0.5080$ | 1.6968 | 55.61 | |
| $R_{21} = - 0.9178$ | | | | |
| | $D_{13} = 0.1129$ | 1.70035 | 30.28 | |
| $R_{22} = \infty$ | | | | 1.119 |

In this example, the equivalent focal length $f_1$ of the convergent front member in front of the air space $S_2$ is $5.3067F_0$. The equivalent focal length $f_2$ of the divergent second member between the air spaces $S_2$ and $S_5$ is $1.4337F_0$ so that the ratio of $F_0$ to the $f$/number of the objective is equal to $0.39f_2$. The equivalent focal length $f_3$ of the convergent stationary rear member behind the air space $S_5$ is $1.6917F_0$ so that the ratio $f_3/F_0$ is equal to 0.94 times the $f$/number of the objective.

The equivalent focal length of the divergent combination of the front two members varies between $2.8143F_0$ and $10.0065F_0$. The ratio of this focal length to the equivalent focal length F of the whole objective remains constant throughout the whole range of variation and is equal to 2.8143, which is 5.0657 times the reciprocal of the $f$/number, 1.8, of the objective.

The ratio $f_1/f_2$ is 3.701, which is 1.283 times the expression $(1+\sqrt{Q})$, where Q is equal to $F_m/F_0$ and $F_m/F_0$ is 3.555. It will be noticed that the ratio $f_3/F_0$ is greater than 1.25 and less than $2.5\sqrt{Q}$, that is 4.714.

The divergent second member between the air spaces $S_2$ and $S_5$ consists of two simple meniscus divergent components located in front of a doublet divergent component, whose internal surface is collective with radius $R_{11}$ equal to $0.96f_2$, the difference between the mean refractive indices of the materials of the two elements of this doublet being 0.247. The radii of curvature of the rear surfaces $R_7$ and $R_9$ of the two simple components are respectively $0.725f_2$ and $1.123f_2$. The range of movement of this divergent member is $1.9431F_0$. The overall axial length of this member between the air spaces $S_2$ and $S_5$ is $1.3547F_0$ or $0.945f_2$.

The convergent front member consists of a convergent doublet component in front of a simple convergent component whose front surface $R_4$ is convex to the front with radius equal to $0.551f_1$. The internal contact surface $R_2$ in this doublet component is dispersive and convex to the front with radius of curvature equal to $0.609f_1$, the difference between the mean refractive indices of the materials of the two elements of this component being 0.11. The rear surface $R_3$ of such doublet is slightly concave to the front with radius of curvature equal to $3.85f_1$.

The semi-angular field covered by the objective varies from about 19½ degrees at minimum equivalent focal length $F_0$ to about 5½ degrees at maximum equivalent focal length $F_m$.

In the position of adjustment giving the lowest value $F_0$ of the equivalent focal length of the objective, the air space $S_2$ between the front two members has its lowest value $0.0564F_0$, whilst the air space $S_5$ between the rear two members has its highest value $2.1124F_0$. When the objective is to be adjusted to increase its equivalent focal length, the middle member is moved backwards towards the stationary rear member until in the position of maximum focal length $F_m$ the air space $S_5$ has been reduced to $0.1693F_0$, and at the same time the air space $S_2$ between the front two members is increased to the maximum value $1.9995F_0$. The backward movement of the middle member from its initial position to increase the equivalent focal length F of the objective from its minimum value $F_0$ is given by the expression $f_2(F-F_0)/\sqrt{F_mF_0}$, and the forward movement of the front member from its initial position is given by the expression $$f_2[F(F_m+F_0-F)-F_0F_m]/F\sqrt{F_mF_0}$$

It will thus be seen that the front member at first moves forward and then back again, returning to its initial position again when F reaches its maximum value $F_m$. The most forward position of the front member occurs when $F=\sqrt{F_mF_0}$ so that at the time the front member has advanced (as indicated at c) by about $0.59F_0$, from its initial position. In this way the overall length of the objective is kept short throughout the range of variation.

During these movements the conjugate distances of the middle member (that is the distances from its nodal points of the image of the object formed by the front member and of the virtual image of such image formed by the middle member) vary; the ratio of such conjugate distances being the magnification produced by the middle member. Thus, if $M_0$ and $M_m$ are the values of such magnification corresponding respectively to the minimum and maximum focal lengths $F_0$ and $F_m$, then $$M_m/M_0 = F_m/F_0$$

The arrangement is such that this magnification passes through unity when $F=\sqrt{F_mF_0}$, so that in fact $$M_0=\sqrt{F_0/F_m} \text{ and } M_m=\sqrt{F_m/F_0}$$

Since the virtual image of the object formed by the combination of the front two members occupies the same position relatively to the stationary rear member in all positions of adjustment (that is, the algebraic sum of the back focal length of this combination and the separation between the middle member and the rear member remains constant in all positions), such image in the example being $4.8573F_0$ in front of the surface $R_{13}$, the position of the image thereof formed by the stationary rear member likewise remains the same, so that the image plane A of the whole objective remains fixed in position throughout the adjustment, the back focal distance a from the rear surface $R_{20}$ to such image plane A being $1.1056F_0$. The size of the image however increases as the equivalent focal length increases, and the ratio of the maximum image size to the minimum image size is clearly equal to $F_m/F_0$.

In the foregoing description of the movements, it has been assumed that the object position remains unchanged, for example at infinity, and it will be clear that for a fixed object position the resultant image position remains fixed, the effect of the adjustments being to alter the size of the image. If, however, the object position changes, a further adjustment will be necessary in order to retain the same resultant image position for all object positions. This can be simply achieved by an additional movement of the front member independently of the middle and rear members. Taking the position (or rather range of positions) of the front member corresponds to an infinitely distant object as the standard, the necessary further adjustment of the front member for focussing for a near object consists of a forward movement of such member through a distance equal to $f_1^2/(d-f_1)$, where $d$ is the distance of the object in front of the front nodal point of the front member in its position of adjustment. Since this expression is independent of the equivalent focal length F of the whole objective, it will be clear that with each and any additional adjustment of the front member to suit a particular object distance, the main movements to vary the focal length and alter the image size can still be effected without altering the resultant image position. This arises from the fact that in any one position of the middle member, the additional movement of the front member to suit object distance is such that the image of the object formed by the front member always occupies the same position relatively to the middle member. In other words, throughout the whole range of both adjustments, the position of the virtual image of the object formed by the combination of the front two members remains constant relatively to the stationary rear member. The two movements can readily be effected by a suitable mechanism interlinking the movement of the middle member with that of a carriage on which the front member is adjustably mounted.

In order to maintain constant relative aperture throughout the range of movement and also to avoid objectionable vignetting of the oblique rays, the clear diameters of all the surfaces of the front two members are made greater than is necessary to accommodate the full axial beam for all settings of the iris diaphragm, which thus alone determines the relative aperture in all positions of adjustment. In the example, the iris diaphragm is located $0.0564F_0$ in front of the surface $R_{13}$ and has maximum diameter of $0.952F_0$. The clear diameters of the individual surfaces in the example are specified in the table of data given above, these values being well in excess of the full diameter of the axial beam. Thus, for instance, the maximum diameter of the axial beam at the surface $R_1$ varies during the adjustment from $0.556F_0$ to $1.976F_0$, the clear diameter of such surface being $3.984F_0$. At the surface $R_5$, whose clear diameter is $3.113F_0$, the axial beam diameter varies from $0.494F_0$ to $1.752F_0$. For the surface $R_6$, having clear diameter $1.795F_0$, the axial beam diameter varies from $0.487F_0$ to $0.997F_0$. For the surface $R_{12}$, having clear diameter $1.072F_0$, the axial beam diameter varies from $0.544F_0$ to $0.930F_0$.

In this first example, the stationary rear member has four components, of which the first is simple and convergent, the second is a divergent doublet, the third is simple and convergent and the fourth is a convergent doublet. The objective is well-corrected throughout the range of variation for the usual primary aberrations and also for secondary aberrations. It is to be appreciated, however, that the number and arrangement of the components of the rear member may be considerably modified, independently of the two front members, according to circumstances.

In the above example, the Petzval sum for the surfaces of the movable convergent front member is $+0.116/F_0$, that for the movable divergent second member is $-0.447/F_0$, that for the stationary convergent rear member is $+0.371/F_0$, and that for the complete objective is $+0.040/F_0$. Since the equivalent power of the rear member is $0.591/F_0$, its Petzval sum is 0.63 times such power. The Petzval sum of the rear member is also equal to $0.532/f_2$ and to $-1.04$ times the equivalent power of the divergent combination of the front two members, at the lower end of the range of focal length variation, such power being $-0.3554/F_0$.

The individual Petzval curvatures of the surfaces of the rear portion of the stationary rear member (such rear portion comprising a convergent simple component followed by a convergent doublet component) are respectively for $R_{18}$ $+0.069/F_0$, for $R_{19}$ $+0.257/F_0$, for $R_{20}$ $+0.275/F_0$, for $R_{21}$ $-0.001/F_0$ and for $R_{22}$ zero, so that the Petzval sum for this rear portion is $0.6/F_0$. The surface $R_{20}$ is both collective and strongly convex to the front and contributes largely towards compensation of the residual distortion error of the front two members. The Abbé V number difference across the cemented surface $R_{21}$ in the doublet component amounts to 25.33, and thus contributes largely towards compensation of the residual oblique colour error of the front two members.

Figure 2:
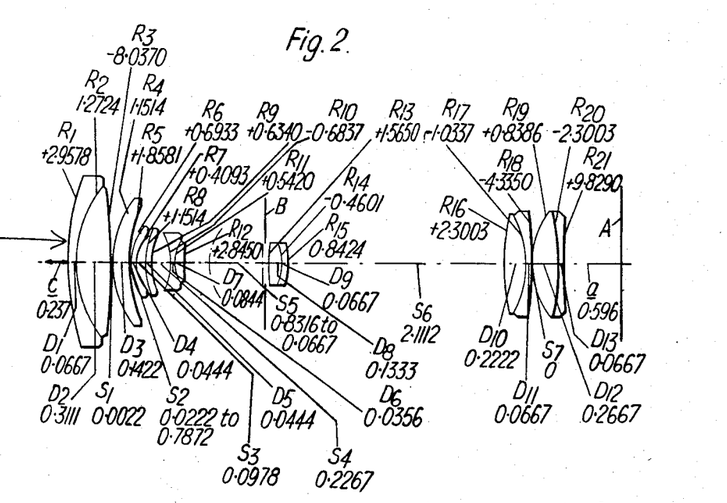
FIGURE 2 shows one example of variable focus objective suitable for use in the larger of such television cameras, as well as for other uses.

Numerical data for the alternative example of variable focus objective shown in FIGURE 2 are set forth in the following table.

*Example II*

[Equivalent focal length varying from $F_0=1.000$ to $F_m=3.555$. Relative aperture $f/4.5$]

| Radius | Thickness or Air Separation | Refractive Index $n_d$ | Abbé V Number | Clear Diameter |
|---|---|---|---|---|
| $R_1 = +2.9578$ | | | | 1.569 |
| | $D_1 = 0.0667$ | 1.7618 | 26.98 | |
| $R_2 = +1.2724$ | | | | |
| | $D_2 = 0.3111$ | 1.651 | 58.60 | |
| $R_3 = -8.0370$ | | | | 1.465 |
| | $S_1 = 0.0022$ | | | |
| $R_4 = +1.1514$ | | | | 1.279 |
| | $D_3 = 0.1422$ | 1.651 | 58.60 | |
| $R_5 = +1.8581$ | | | | 1.226 |
| | $S_2 = 0.0222$ to 0.7872 | | | |
| $R_6 = +0.6933$ | | | | 0.707 |
| | $D_4 = 0.0444$ | 1.6234 | 56.22 | |
| $R_7 = +0.4093$ | | | | 0.600 |
| | $S_3 = 0.0978$ | | | |
| $R_8 = +1.1514$ | | | | 0.594 |
| | $D_5 = 0.0444$ | 1.6234 | 56.22 | |
| $R_9 = +0.6340$ | | | | 0.542 |
| | $S_4 = 0.2267$ | | | |
| $R_{10} = -0.6837$ | | | | 0.455 |
| | $D_6 = 0.0356$ | 1.5151 | 56.35 | |
| $R_{11} = +0.5420$ | | | | |
| | $D_7 = 0.0844$ | 1.7618 | 26.98 | |
| $R_{12} = +2.8450$ | | | | 0.388 |
| | $S_5 = 0.8316$ to 0.0667 | | | |
| $R_{13} = +1.5650$ | | | | 0.388 |
| | $D_8 = 0.1333$ | 1.5151 | 56.35 | |
| $R_{14} = -0.4601$ | | | | |
| | $D_9 = 0.0667$ | 1.7283 | 28.66 | |
| $R_{15} = -0.8424$ | | | | 0.405 |
| | $S_6 = 2.1112$ | | | |
| $R_{16} = +2.3003$ | | | | 0.984 |
| | $D_{10} = 0.2222$ | 1.5075 | 61.16 | |
| $R_{17} = -1.0337$ | | | | |
| | $D_{11} = 0.0667$ | 1.70035 | 30.28 | |
| $R_{18} = -4.3350$ | | | | 1.014 |
| | $S_7 = 0$ | | | |
| $R_{19} = +0.8386$ | | | | 1.041 |
| | $D_{12} = 0.2667$ | 1.5097 | 64.44 | |
| $R_{20} = -2.3003$ | | | | |
| | $D_{13} = 0.0667$ | 1.70035 | 30.28 | |
| $R_{21} = +9.8290$ | | | | 0.986 |

In this second example, the iris diaphragm B, which has a maximum diameter $0.381F_0$, is located $0.0222F_0$ in front of the front surface $R_{18}$ of the rear member, and the virtual image of the object formed by the divergent combination of the front two members is located $1.8901F_0$ in front of the diaphragm. The back focal distance $a$ from the rear surface $R_{21}$ to the image plane A is $0.596F_0$ and remains constant in all positions of adjustment. The semi-angular field covered is the same as in the first example, varying from 19½ degrees at minimum equivalent focal length $F_0$ to 5½ degrees at maximum equivalent focal length $F_m$. The equivalent focal length $f_1$ of the front member is $2.0892F_0$ and that of the divergent second member $f_2$ is $0.5644F_0$, so that the ratio of $F_0$ to the $f$/number in this example is $0.39f_2$. The equivalent focal length $f_3$ of the stationary rear member is $3.1585 F_0$, so that the ratio $f_3/F_0$ is equal to 0.713 times the $f$/number of the objective.

As in the first example the ratio $f_1/f_2$ is 3.701 or 1.283 $(1+\sqrt{Q})$. The ratio $f_3/F_0$ is again greater than 1.25 and less than $2.5\sqrt{Q}$, Q being again equal to 3.555.

The ratio of the equivalent focal length of the divergent combination of the front two members to that of the whole objective is again constant and is equal to 1.108, which is 4.986 times the reciprocal of the f/number (4.5) of the objective.

In the example of FIGURE 2, the rear member comprises two widely spaced convergent portions, the front portion consisting of a convergent doublet component having equivalent focal length $1.38F_0$, whilst the rear portion consists of two convergent doublet components, whose combined equivalent focal length is $1.52F_0$. It will be noticed that the equivalent focal lengths of the two portions of the rear member are each less than the axial air space between them.

The individual Petzval curvatures of the surfaces of the rear portion of the rear member are respectively, for $R_{16}$ $0.146/F_0$, for $R_{17}$ $-0.073/F_0$, for $R_{18}$ $+0.095/F_0$, for $R_{19}$ $+0.403/F_0$, for $R_{20}$ $-0.032/F_0$, and for $R_{21}$ $-0.042/F_0$, so that the Petzval sum for all the surfaces of such rear portion is positive and equal to $0.497/F_0$. The Petzval sum of the whole rear member is positive and equal to $0.958/F_0$, which equals $0.540/f_2$ or 1.07 times the equivalent power $(0.903/F_0)$ of the divergent combination of the front two members in the minimum focal length position. The surface $R_{19}$ is both collective and strongly convex towards the diaphragm of the objective and thus largely contributes towards compensation for the residual distortion error of the front two members. The Abbé V number difference across the cemented surface $R_{17}$ is 30.88 and that across the cemented surface $R_{20}$ is 34.16, such differences, especially the latter, largely contributing towards correction of the residual oblique colour error of the front two members. The movements of the front two members are the same as those described for the first example but on a reduced scale, the maximum forward movement of the front member being indicated at c (approximately $0.24F_0$) whilst the front and rear surfaces of the divergent second member in its rearmost position are indicated by broken lines.

It will be observed that the components of the first and second members in the second example are arranged in the same manner as in the first example, and furthermore that the radii of curvature of individual surfaces of the front member have the same relationships with the equivalent focal length $f_1$ of such member in each example, as have also the radii of curvatures of surfaces in the second member with the equivalent focal length $f_2$.

It will be clear that the objective in either of the two above-described examples may be proportionately scaled dimensionally to suit various requirements. For example, the objective in either example may be scaled dimensionally to have a minimum equivalent focal length $F_0$ of 1 centimetre and a maximum equivalent focal length $F_m$ of 3.555 centimetres, or alternatively the objective may be scaled so that $F_0$ is equal to 1 inch and $F_m$ is equal to 3.555 inches. In the former case, the figures in the table for such example are indicative of measurements in centimetres and in the latter case such figures are indicative of measurements in inches. The scaling factor for the complete objective in this instance is 2.54, that is, the ratio 1 inch to 1 centimetre. When the complete objective is scaled in this manner not only the angular field covered by the objective remains unaltered, but also the f/number of the objective is unaltered.

It may sometimes be the case, for example with two differently sized television cameras having different sensitivities, that in addition to such cameras requiring variable focus objectives whose minimum and maximum equivalent focal lengths are related by a scaling factor, for example of approximately 2.5, the larger camera need only be provided with an objective having an f/number of about 2.5 times the f/number of the objective needed for the smaller camera. In the first example above described, where the equivalent focal length $f_3$ of the rear member is materially smaller than the combined equivalent focal length of the front two members, when the rear member of the objective is replaced by an alternative rear member whose equivalent focal length is about 2.5 times that of the rear member given in the table, without altering the front two members, the minimum and maximum equivalent focal lengths of the two alternative complete objectives thus obtained are respectively related by a factor of approximately 2.5, the angular fields covered by the two objectives are the same and the f/numbers of the two objectives are related by a factor of approximately 2.5. Now if the data in the second table above set forth are scaled up by a factor of about 2.5, it will be realised that the data given for the front two members become identical with that given for the front two members in the first table, so that the examples of FIGURES 1 and 2 constitute two alternative complete objectives of the above-described kind, the rear member of the second example being and alternative rear member for the same front two members. The two alternative complete objectives are respectively suitable for use in the two television cameras above mentioned, the objective of the first example being suitable for the smaller camera and the objective of the second example being suitable for the larger camera.

The following table sets for the numerical data for the rear member of Example II in terms of the same basic unit as the table for Example I, i.e. the minimum equivalent focal length $F_0$ of Example I.

| Radius | Thickness or Air Separation | Refractive Index $n_d$ | Abbé V Number | Clear Diameter |
|---|---|---|---|---|
| | $S_5 = 2.1124$ to 0.1693 | | | |
| $R_{13} = + 3.9752$ | | | | 0.985 |
| | $D_8 = 0.3387$ | 1.51507 | 56.35 | |
| $R_{14} = - 1.1687$ | | | | |
| | $D_9 = 0.1693$ | 1.72830 | 28.66 | |
| $R_{15} = - 2.1397$ | | | | 1.028 |
| | $S_6 = 5.3625$ | | | |
| $R_{16} = + 5.8428$ | | | | 2.500 |
| | $D_{10} = 0.5645$ | 1.50749 | 61.16 | |
| $R_{17} = - 2.6255$ | | | | |
| | $D_{11} = 0.1693$ | 1.70035 | 30.28 | |
| $R_{18} = -11.0109$ | | | | 2.576 |
| | $S_7 = 0$ | | | |
| $R_{19} = + 2.1301$ | | | | 2.645 |
| | $D_{12} = 0.6774$ | 1.50970 | 64.44 | |
| $R_{20} = - 5.8428$ | | | | |
| | $D_{13} = 0.1693$ | 1.70035 | 30.28 | |
| $R_{21} = +24.9657$ | | | | 2.504 |

The data in this table completely describes the alternative rear member for the objective of Example I, which is suitable for the smaller television camera, to provide an alternative objective suitable for the larger television camera. It will be clear that in these alternative objectives, the rear members are not related simply by a scaling factor since, when one of such rear members is dimensionally scaled, its degree of aberration correction is also similarly scaled, whilst the requirement is that the aberration correction afforded by each rear member should be the same since the alternative objectives employ identical movable members and the aberration corrections of the rear member must compensate for the residual aberrations of the front members. One advantage of modifying the rear member only of the objective for the smaller camera to suit the larger camera is that the larger camera will be able to focus on objects equally as close to the camera as will the smaller camera, whereas the scaling up of the whole objective results in a corresponding scaling up of this minimum focussing distance. It will be apparent in the above described circumstances, that instead of providing two complete objectives, one for each camera, it may often be convenient to provide interchangeable rear members in the mount housing the movable members, such complete mount being suitable for use in either one of the cameras. For convenience, FIGURES 1 and 2 have been drawn to scales which make the size of the front two members the same in each figure in order to make clear the interchangeability of the rear members. This means that in terms of the minimum equivalent focal length $F_0$ respectively of Examples I and II, the scale of FIGURE 2 is approximately 2.5 times the scale of FIGURE 1 since the minimum equivalent focal length $F_0$ of such examples are related by this factor.

It should be mentioned, however, that when the rear member of one objective is replaced by another rear member, so as to give an alternative objective having an increased equivalent focal length (in any position of adjustment of the front members) and approximately the same angular field, the Petzval sum of the rear member should not be reduced and the ratio of such sum to the equivalent power of the rear member will therefore increase in approximately the same proportion as the increase in the equivalent focal length. Conversely, a substitution of a more powerful rear member to provide an alternative objective of reduced equivalent focal length would reduce such ratio.

In a further variant of either of the above described complete objectives, the equivalent focal length of the whole objective may be increased, in any position of adjustment, by appropriate change of rear member, without changing the image size. This results in smaller angular fields of view and in these circumstances it is permissible to reduce the Petzval sum of the whole objective or to make such sum negative. Small changes of this kind can be achieved by merely scaling the rear member and making relatively minor dimensional changes to re-balance the aberrations.

Figure 3:
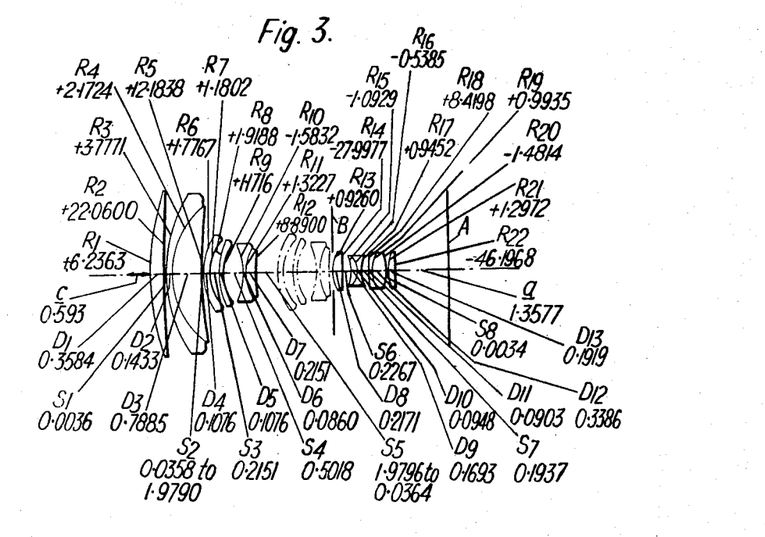
FIGURE 3 shows a further example which may be used in the smaller television camera.

A further example of variable focus objective is shown in FIGURE 3 and numerical data for such example are given in the following table.

*Example III*

Equivalent focal length varying from $F_0=1.000$ to $F_m=3.555$. Relative aperture $f/1.9$]

| Radius | Thickness or Air Separation | Refractive Index $n_d$ | Abbé V Number | Clear Diameter |
|---|---|---|---|---|
| $R_1 =+ 6.2363$ | | | | 4.144 |
| | $D_1 =0.3584$ | 1.6510 | 58.60 | |
| $R_2 =+22.0600$ | | | | 4.095 |
| | $S_1 =0.0036$ | | | |
| $R_3 =+ 3.7771$ | | | | 3.794 |
| | $D_2 =0.1433$ | 1.7484 | 27.85 | |
| $R_4 =+ 2.1724$ | | | | |
| | $D_3 =0.7885$ | 1.6510 | 58.60 | |
| $R_5 =+12.1838$ | | | | 3.319 |
| | $S_2 =0.0358$ to 1.9790 | | | |
| $R_6 =+ 1.7767$ | | | | 1.816 |
| | $D_4 =0.1076$ | 1.7200 | 50.31 | |
| $R_7 =+ 1.1802$ | | | | 1.588 |
| | $S_3 =0.2151$ | | | |
| $R_8 =+ 1.9188$ | | | | 1.515 |
| | $D_5 =0.1076$ | 1.7200 | 50.31 | |
| $R_9 =+ 1.1716$ | | | | 1.349 |
| | $S_4 =0.5018$ | | | |
| $R_{10}=- 1.5832$ | | | | 1.224 |
| | $D_6 =0.0860$ | 1.5076 | 61.16 | |
| $R_{11}=+ 1.3227$ | | | | |
| | $D_7 =0.2151$ | 1.7484 | 27.85 | |
| $R_{12}=+ 8.8900$ | | | | 1.146 |
| | $S_5 =1.9796$ to 0.0364 | | | |
| $R_{13}=+ 0.9260$ | | | | 0.858 |
| | $D_8 =0.2171$ | 1.7170 | 47.90 | |
| $R_{14}=-27.9977$ | | | | 0.823 |
| | $S_6 =0.2267$ | | | |
| $R_{15}=- 1.0929$ | | | | 0.722 |
| | $D_9 =0.1693$ | 1.7230 | 37.99 | |
| $R_{16}=- 0.5385$ | | | | |
| | $D_{10}=0.0948$ | 1.6535 | 33.48 | |
| $R_{17}=+ 0.9452$ | | | | 0.696 |
| | $S_7 =0.1937$ | | | |
| $R_{18}=+ 8.4198$ | | | | 0.844 |
| | $D_{11}=0.0903$ | 1.7003 | 30.28 | |
| $R_{19}=+ 0.9935$ | | | | |
| | $D_{12}=0.3386$ | 1.6910 | 54.80 | |
| $R_{20}=- 1.4814$ | | | | 1.019 |
| | $S_8 =0.0034$ | | | |
| $R_{21}=+ 1.2972$ | | | | 1.109 |
| | $D_{13}=0.1919$ | 1.6910 | 54.80 | |
| $R_{22}=-46.1968$ | | | | 1.099 |

In this example, the back focal length $a$ from the surface $R_{22}$ to the rear focal plane A of the objective is $1.3577F_0$. The iris diaphragm B is located as near the front surface $R_{13}$ of the rear member as is practicable.

The equivalent focal length $f_1$ of the convergent front member in front of the air space $S_2$ is $5.5227F_0$. The equivalent focal length $f_2$ of the divergent member between the air spaces $S_2$ and $S_5$ is $1.4338F_0$ so that the ratio of $F_0$ to the $f$/number (1.9) of the objective is $0.365f_2$. The equivalent focal length $f_3$ of the convergent stationary rear member behind the air space $S_4$ is $1.4649F_0$ so that the ratio $f_3/F_0$ is equal to 0.771 times the $f$/number of the objective.

The equivalent focal length of the divergent combination of the front two members varies between $2.9291F_0$ and $10.4146F_0$. The ratio of this focal length to the equivalent focal length F of the whole objective remains constant throughout the whole range of variation and is equal to 2.9291, which is 5.565 times the reciprocal of the $f$/number (1.9) of the objective. The ratio $f_1/f_2$ is 3.851, which is 1.335 times the expression $(1+\sqrt{Q})$, where Q is $F_m/F_0$ which equals 3.555. It will be noticed that $f_3/F_0$ is greater than 1.25 and less than $2.5\sqrt{Q}$, that is 4.714.

The divergent member between the air spaces $S_2$ and $S_5$ consists of two simple meniscus divergent components located in front of a doublet divergent component, whose internal contact surface $R_{11}$ is collective, the radii of curvature of the rear surfaces $R_7$ and $R_9$ of such simple components respectively being equal to $0.823f_2$ and $0.818f_2$. The range of movement of this divergent member is $1.943F_0$. The convergent front member consists of a simple convergent component in front of a convergent doublet, whose internal contact surface $R_4$ is dispersive. The front surface $R_3$ of the doublet component of the front member has a radius of curvature equal to $0.684f_1$.

The semi-angular field covered by the objective in the example of FIGURE 3 varies from about 19½ degrees at minimum equivalent focal length $F_0$ to about 5½ degrees at maximum equivalent focal length $F_m$.

The movements of the two front members follow the same general laws as those for the first example described, so that during the variation of the equivalent focal length of the objective from its minimum value $F_0$ to its maximum value $F_m$, the divergent second member moves backwards toward the stationary rear member, while the convergent front member at first moves forward and then moves back again to its initial position. The maximum forward movement of the front member is indicated at $c$ and is about $0.59F_0$. During this movement the air space $S_2$ increases from its lowest to its highest value, and the air space $S_5$ decreases from its highest to its lowest value. The virtual image of the object formed by the front two members occupies the same position relatively to the stationary rear member, namely $4.655F_0$ in front of the surface $R_{13}$, in all positions of adjustment, so that the image plane A of the whole objective remains fixed in position throughout the adjustment. Focussing on near objects is again effected by an additional movement of the convergent front member alone, the arrangement being such that the image plane remains in the same position for all object distances.

As mentioned in connection with the first example, in order to retain constant relative aperture throughout the range of movements and also to avoid objectionable vignetting of oblique rays, the clear diameters of all the surfaces of the front two members are made greater than is necessary to accommodate the full axial beam for all settings of the iris diagphram, which thus alone determines the effective aperture in all positions of adjustment. Thus, in the example of FIGURE 3, the maximum diameter of the full axial beam respectively at the front surface $R_1$ and at the rear surface $R_5$ of the front member varies from $0.526F_0$ to $1.871F_0$ and from $0.446F_0$ to $1.594F_0$ during the movements, but the actual clear diameters of these surfaces $R_1$ and $R_5$ are respectively $4.144F_0$ and $3.319F_0$. The maximum diameter of the axial beam respectively at the front surface $R_6$ and at the rear surface $R_{12}$ of the middle member varies from $0.441F_0$ to $0.903F_0$ and from $0.482F_0$ to $0.831F_0$, the actual clear diameters of these surfaces $R_6$ and $R_{12}$ being $1.816F_0$ and $1.146F_0$.

As shown in FIGURE 3, the stationary rear member has four components of which the first is simple and convergent, the second is a divergent doublet, the third is a convergent doublet and the fourth is simple and convergent. The objective of the example is well-corrected throughout the range of variation for the usual primary aberrations and also for secondary aberrations.

In this third example, the Petzval sum for the surfaces of the movable convergent front member is $0.111/F_0$, that for the movable divergent second member is $-0.450/F_0$, that for the stationary convergent rear member is $0.354/F_0$, and that for the complete objective is $0.015/F_0$. The Petzval sum of the rear member is thus 0.52 times its equivalent power, or $-1.04$ times the equivalent power of the divergent combination of the front two members at the lower end of the range of focal length variation. Such Petzval sum is also equal to $0.507/f_2$.

The individual Petzval curvatures of the rear portion of the rear member are respectively for $R_{18}$ $0.049/F_0$, for $R_{19}$ $-0.003/F_0$, for $R_{20}$ $0.276/F_0$, for $R_{21}$ $0.315/F_0$ and for $R_{22}$ $0.009/F_0$, so that the Petzval sum for all surfaces of such rear portion is $0.646/F_0$.

Figure 4:
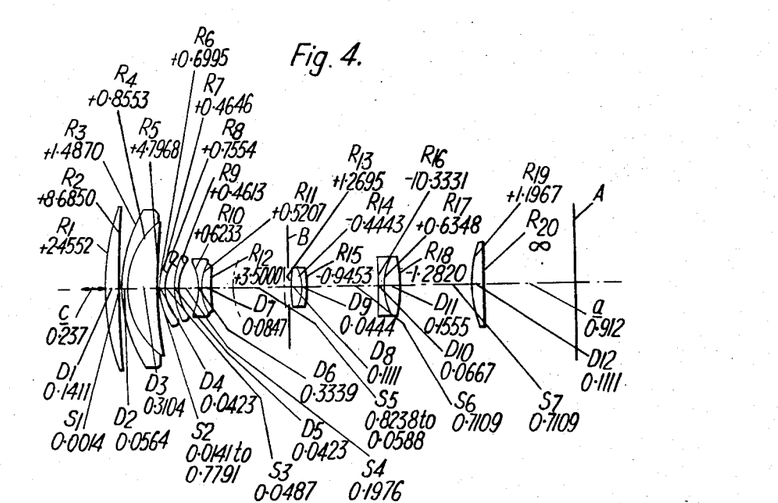
FIGURE 4 shows a fourth example which may be used in the larger television camera.

A fourth example of variable focus objective is shown in FIGURE 4 and numerical data for such example are set forth in the following table.

*Example IV*

[Equivalent focal length varying from $F_0=1.000$ to $F_m=3.557$. Relativ aperture $f/4.8$]

| Radius | Thickness or Air Separation | Refractive Index $n_d$ | Abbé V Number | Clear Diameter |
|---|---|---|---|---|
| $R_1=+2.4552$ | | | | 1.631 |
| | $D_1=0.1411$ | 1.6510 | 58.60 | |
| $R_2=+8.6850$ | | | | 1.612 |
| | $S_1=+0.0014$ | | | |
| $R_3=+1.4870$ | | | | 1.494 |
| | $D_2=0.0564$ | 1.7484 | 27.85 | |
| $R_4=+0.8553$ | | | | |
| | $D_3=0.3104$ | 1.6510 | 58.60 | |
| $R_5=+1.7968$ | | | | 1.307 |
| | $S_2=0.0141$ to 0.7791 | | | |
| $R_6=+0.6995$ | | | | 0.715 |
| | $D_4=0.0423$ | 1.7200 | 50.31 | |
| $R_7=+0.4646$ | | | | 0.625 |
| | $S_3=0.0847$ | | | |
| $R_8=+0.7554$ | | | | 0.596 |
| | $D_5=0.0423$ | 1.7200 | 50.31 | |
| $R_9=+0.4613$ | | | | 0.531 |
| | $S_4=0.1976$ | | | |
| $R_{10}=-0.6233$ | | | | 0.482 |
| | $D_6=0.0339$ | 1.5076 | 61.16 | |
| $R_{11}=+0.5207$ | | | | |
| | $D_7=0.0847$ | 1.7484 | 27.85 | |
| $R_{12}=+3.5000$ | | | | 0.451 |
| | $S_5=0.8238$ to 0.0588 | | | |
| $R_{13}=+1.2695$ | | | | 0.331 |
| | $D_8=0.1111$ | 1.5190 | 60.42 | |
| $R_{14}=-0.4443$ | | | | |
| | $D_9=0.0444$ | 1.7000 | 41.18 | |
| $R_{15}=-0.9453$ | | | | 0.342 |
| | $S_6=0.7109$ | | | |
| $R_{16}=-10.3331$ | | | | 0.547 |
| | $D_{10}=0.0667$ | 1.6258 | 35.74 | |
| $R_{17}=+0.6348$ | | | | |
| | $D_{11}=0.1555$ | 1.5097 | 64.44 | |
| $R_{18}=-1.2820$ | | | | 0.596 |
| | $S_7=0.7109$ | | | |
| $R_{19}=+1.1967$ | | | | 0.815 |
| | $D_{12}=0.1111$ | 1.5151 | 56.35 | |
| $R_{20}=\infty$ | | | | 0.812 |

In this example, the iris diaphragm B is located $0.044F_0$ in front of the front surface $R_{13}$ of the rear member, so that its position relative to the front members in any given position of adjustment remains unchanged. The virtual image formed by the combination of the front two members is located $1.833F_0$ in front of the diaphragm. The back focal length $a$ from the surface $R_{20}$ to the rear focal plane A of the objective is $0.9118F_0$.

The angular field covered is the same as in Example III, varying from about 19½ degrees at minimum equivalent focal length $F_0$ to 5½ degrees at maximum equivalent focal length $F_m$.

The equivalent focal length $f_1$ of the convergent front member is $2.1743F_0$ and that of the divergent second member is $0.5645F_0$ so that the ratio of $F_0$ to the $f$/number (4.8) is $0.369f_2$. The equivalent focal length $f_3$ of the stationary rear member is $1.4555F_0$ so that $f_3/F_0$ equals 0.303 times the $f$/number of the objective.

The ratio of $f_1/f_2$ is 0.385, the same as in the example of FIGURE 3, whilst the ratio of $f_3/F_0$ is again greater than 1.25 and less than $2.5\sqrt{Q}$, where Q is equal to $F_m/F_0$ which equals 3.557.

The Petzval sum of the rear member is positive and equal to $0.9827/F_0$ or $0.555/f_2$, whilst the individual Petzval curvatures of the surfaces of the rear portion of the rear member are respectively, for $R_{16}$ $-0.037/F_0$, for $R_{17}$ $-0.0745/F_0$, for $R_{18}$ $+0.263/F_0$, for $R_{19}$ $+0.284/F_0$ and for $R_{20}$ zero, so that the Petzval sum for such rear portion is $0.436/F_0$.

The movements of the front two members in Example IV are the same as those described for Example II, the maximum forward movement of the front member being approximately $0.24F_0$ as indicated at $c$, and the front and rear surfaces of the divergent second member in its rearmost position being indicated by broken lines.

As with Examples I and II, it will be realised that if the data for the fourth example are scaled up by a factor of approximately 2,5, the data for the front two members are identical in each of Examples III and IV, so that the rear member of FIGURE 4 constitutes an alternative rear member for the same two front members, the scales of FIGURES 3 and 4, in terms of the minimum equivalent focal lengths $F_0$ respectively of Examples III and IV, being related in the same manner as those of FIGURES 1 and 2. The complete objective of FIGURE 3 is thus suitable for use in the smaller of the television cameras above mentioned whilst the objective of FIGURE 4 is suitable for use in the larger of such cameras.

The following table sets forth the numerical data for the rear member of Example IV in terms of the minimum equivalent focal length $F_0$ for Example III.

| Radius | Thickness or Air Separation | Refractive Index $n_d$ | Abbé V Number | Clear Diameter |
|---|---|---|---|---|
| | $S_5=2.0925$ to 0.1493 | | | |
| $R_{13}=+3.2245$ | | | | 0.840 |
| | $D_8=0.2821$ | 1.5190 | 60.42 | |
| $R_{14}=-1.1286$ | | | | |
| | $D_9=0.1129$ | 1.7000 | 41.18 | |
| $R_{15}=-2.4012$ | | | | 0.869 |
| | $S_6=1.8057$ | | | |
| $R_{16}=-26.2462$ | | | | 1.390 |
| | $D_{10}=0.1693$ | 1.6258 | 35.74 | |
| $R_{17}=+1.6123$ | | | | |
| | $D_{11}=0.3950$ | 1.5097 | 64.44 | |
| $R_{18}=-3.2562$ | | | | 1.515 |
| | $S_7=1.8057$ | | | |
| $R_{19}=+3.03956$ | | | | 2.070 |
| | $D_{12}=0.2821$ | 1.5151 | 56.35 | |
| $R_{20}=\infty$ | | | | 2.063 |

It should further be mentioned, however, that by contrast with the rear member of Example III, the rear member of Example IV has only three components, two convergent doublets in front of a simple convergent component. It will thus be appreciated that the number and arrangement of the components of the rear member may be considerably modified, independently of the two axially movable members, according to circumstances. When correction for some or all secondary aberrations can be sacrificed the rear member may be simplified. Thus, in comparing the alternative rear members of FIGURES 1, 2, 3 and 4, it may be mentioned that when a high degree of correction is required the slightly more simple design of FIGURE 4 is less satisfactory than the other designs, firstly because the rear member of FIGURE 4 has a smaller collective power remote from the diaphragm so that the distortion produced by the front members cannot be as well counteracted as in the other rear members, and secondly because the lesser number of surfaces remote from the diaphragm in the rear member of FIGURE 4 does not permit lateral chromatic aberration produced by the front members to be as well counteracted as in the other rear members. It will, however, be clear that whatever the arrangement of the rear member, such member should in each case afford aberration correction generally equal and opposite to the aberrations of the axially movable members so that the complete objective is corrected with respect to the diaphragm.

What I claim as my invention and desire to secure by Letters Patent is:

1. An optical objective of variable focal length corrected for spherical and chromatic aberrations, coma, astigmatism, field curvature and distortion throughout the range of variation, comprising a stationary convergent rear member including at least six air-exposed surfaces and a divergent combination constituted by an axially movable divergent member located in front of the stationary rear member and an axially movable convergent member located in front of such axially movable divergent member, the ratio of the equivalent focal length of the divergent combination of the front two members to the equivalent focal length of the complete objective remaining constant and the virtual image of a distant object formed by such divergent combination having a constant axial position relative to the stationary rear member throughout the range of variation, and the convergent front member comprising a plurality of convergent components including at least one simple component and at least one doublet component having a dispersive internal contact surface which is convex to the front, the difference between the refractive indices of the materials of the two elements of such doublet component of the front member lying between 0.05 and 0.15, while the divergent second member comprises a plurality of divergent components including a dirergent doublet rear component having a collective internal contact surface which is convex to the front with radius of curvature lying between $0.66f_2$ and $1.5f_2$, where $f_2$ is the equivalent focal length of the second member, the mean refractive index of the material of the rear element of such doublet component of the second member exceeding that of the material of the front element of such component by between 0.15 and 0.3, and the plurality of divergent components of the divergent second member also including at least one divergent simple meniscus component which has a rear surface convex to the front with radius of curvature not less than $0.33f_2$ and not greater than the range of axial movement of such divergent second member, while the overall axial length of the divergent second member lies between $0.6f_2$ and $1.3f_2$, the ratio of the equivalent focal length of the divergent combination of the front two members to the equivalent focal length of the whole objective lying between 3 and 8 times the reciprocal of the $f$/number of the objective.

2. An optical objective as claimed in claim 1 in which the convergent front member comprises a convergent doublet component and a simple convergent component located behind such doublet component, the front surface of such simple component being convex to the front with radius of curvature between $0.4f_1$ and $0.8f_1$, where $f_1$ is the equivalent focal length of the convergent front member while the internal contact surface in such doublet component is convex to the front with radius of curvature between $0.4f_1$ and $0.9f_1$, the radius of curvature of the rear surface of the front component of the convergent front member being greater than 1.5 times the equivalent focal length $f_1$ of such front member.

3. An optical objective as claimed in claim 1 in which the convergent front member comprises a convergent doublet component and a simple convergent component located in front of such doublet component, the front surface of such doublet component being convex to the front with radius of curvature between 0.5 and 1.0 times the equivalent focal length ($f_1$) of the convergent front member, at least one simple meniscus component in the divergent second member having its rear surface convex to the front with radius of curvature not less than $0.5f_2$ while the radius of curvature of the rear surface of the front component of the convergent front member is greater than 1.5 times the equivalent focal length $f_1$ of such front member.

4. An optical objective as claimed in claim 1 in which the Petzval sum for all the surfaces of the stationary rear member lies between 0.7 and 1.4 times the positive value of the equivalent power of the divergent combination of the front two members in the position of adjustment corresponding to the lower end of the range of variation of the equivalent focal length of the objective, such Petzval sum also lying between $0.35/f_2$ and $0.7/f_2$ and between 0.3 and 4.0 times the equivalent power of the rear member.

5. An optical objective as claimed in claim 1 in which the Petzval sum for all surfaces included in the rear portion of such stationary rear member (that is the portion having the rear four of the air-exposed surfaces of such member) is positive and lies between 0.25 and 0.85 times the reciprocal of the equivalent focal length of the complete objective at the lower end of the range of variation thereof.

6. An optical objective as claimed in claim 1 in which the stationary rear member consists of two convergent portions separated by an air space whose axial length is greater than the equivalent focal length of either of such portions, while the ratio of the equivalent focal length $f_3$ of the stationary rear member to the equivalent focal length of the complete objective at the lower end of the range of variation thereof lies between 0.2 and 1.2 times the $f$/number of the objective.

7. An optical objective as claimed in claim 1, in which at least one of the four rear air-exposed surfaces of the stationary rear member is both collective and strongly convex towards the diaphragm of the objective, whilst the rear portion of the stationary rear member (that is the portion having the rear four of the air-exposed surfaces of such member) includes at least one internal contact between a convergent element and a divergent element, the Abbé V number of the material of such convergent element exceeding that of such divergent element by at least 20.

8. An optical objective as claimed in claim 1, in which the diaphragm of the objective is located at or near the front surface of the stationary rear member, and the diameters of the front two members are made larger than is necessary to accommodate the full axial beam, so that the relative aperture of the objective is determined solely by the diaphragm and therefore remains constant throughout the range of variation.

9. An optical objective as claimed in claim 1 including a lens mount for housing the objective and means carried by the lens mount for axially moving the front member independently of the second and third members to effect focussing for near objects.

10. An optical objective as claimed in claim 1 including a lens mount for housing the objective, and means carried by the lens mount whereby alternative rear members can be selectively attached to the mount in the correct position relative to the front axially movable members.

11. An optical objective of variable focal length corrected for spherical and chromatic aberrations, coma, astigmatism, field curvature and distortion throughout the range of variation, comprising a stationary convergent rear member, and a divergent combination constituted by an axially movable divergent member located in front of the stationary rear member and an axially movable convergent member located in front of such axially movable divergent member, the ratio of the equivalent focal length of the divergent combination of the front two members to the equivalent focal length of the complete objective remaining constant and the virtual image of a distant object formed by such divergent combination having a constant axial position relative to the stationary rear member throughout the range of variation, the convergent front member comprising a convergent doublet component whose internal contact surface is dispersive and convex to the front with radius of curvature between $0.4f_1$ and $0.9f_1$ and a simple convergent component which is located behind such doublet component and has its front surface convex to the front with radius of curvature between $0.4f_1$ and $1.0f_1$, where $f_1$ is the equivalent focal length of the convergent front member, while the divergent second member comprises a divergent doublet component whose internal contact surface is collective and convex to the front with radius of curvature between $0.66f_2$ and $1.5f_2$ and at least one simple divergent meniscus component which is located in front of such doublet component and has its rear surface convex to the front with radius of curvature not less than $0.33f_2$ and not greater than the range of axial movement of such divergent second member, where $f_2$ is the equivalent focal length of the divergent second member, the stationary convergent rear member including at least six air-exposed surfaces, the Petzval sum for all surfaces included in the rear portion of such rear member (that is the portion having the rear four of the air-exposed surfaces of such member) being positive and lying between 0.25 and 0.85 times the reciprocal of the equivalent focal length of the complete objective at the lower end of the range of variation thereof.

12. An optical objective as claimed in claim 11, in which the Petzval sum for all the surfaces of the stationary rear member lies between $0.3/f_3$ and $4.0/f_3$, where $f_3$ is the equivalent focal length of such stationary rear member, the ratio of such equivalent focal length $f_3$ to the equivalent focal length of the complete objective at the lower end of the range of variation thereof lying between 0.2 and 1.2 times the f/number of the objective.

13. An optical objective as claimed in claim 11 in which the ratio of the equivalent focal length of the divergent combination of the front two members to the equivalent focal length of the whole objective lies between 3 and 8 times the reciprocal of the f/number of the objective while the overall axial length of the divergent second member lies between $0.6f_2$ and $1.3f_2$.

14. An optical objective as claimed in claim 11, in which the equivalent focal length $f_1$ of the convergent front member lies between $1.0f_2$ and $1.67f_2$ times the value of the expression $(1+\sqrt{Q})$, where Q is the ratio of the value of the upper limit of the range of variation of the equivalent focal length of the complete objective to the value of the lower limit thereof, the ratio of the equivalent focal length of the complete objective at the lower end of the range of variation thereof to the f/number of the objective lying between $0.27f_2$ and $0.56f_2$.

References Cited in the file of this patent

UNITED STATES PATENTS

| | | |
|---|---|---|
| 2,165,341 | Capstaff et al. | July 11, 1939 |
| 2,649,025 | Cook | Aug. 18, 1953 |
| 2,741,155 | Hopkins | Apr. 10, 1956 |
| 2,746,350 | Hopkins | May 22, 1956 |
| 2,843,016 | Reiss | July 15, 1958 |
| 2,844,996 | Klemt | July 29, 1958 |
| 2,847,907 | Angenieux | Aug. 19, 1958 |
| 2,937,572 | Yamaji | May 24, 1960 |

FOREIGN PATENTS

| | | |
|---|---|---|
| 381,662 | Great Britain | Oct. 13, 1932 |
| 856,897 | France | Apr. 1, 1940 |
| 1,080,099 | France | May 26, 1954 |